H. B. Morrison,

Nozzle,

N° 39,700.                                   Patented Aug. 25, 1863.

Witnesses

Inventor
H. B. Morrison
Per Munn & Co.
Attys

UNITED STATES PATENT OFFICE.

H. B. MORRISON, OF LEROY, NEW YORK, ASSIGNOR TO C. H. MORRISON, OF SAME PLACE.

ATTACHING REVOLVING TIPS TO HOSE-NOZZLES.

Specification forming part of Letters Patent No. 39,700, dated August 25, 1863.

*To all whom it may concern:*

Be it known that I, H. B. MORRISON, of Leroy, in the county of Genesee and State of New York, have invented a new and useful Improvement in Attaching Revolving Tips to Hose-Nozzles; and I do hereby declare that the following is a full, clear, and exact description of the same, reference being had to the accompanying drawings, making a part of this specification, in which—

Figure 1:
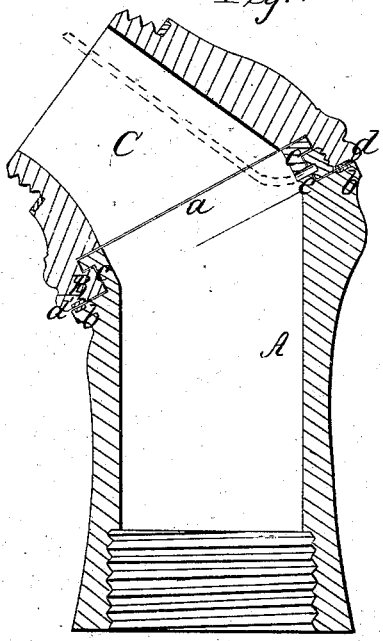
Figure 2:
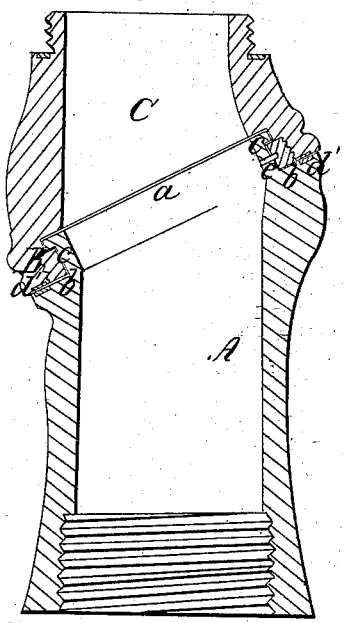
Figure 3:
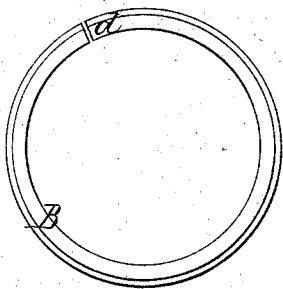

Figures 1 and 2 are longitudinal central sections of a nozzle and tip connected together according to my invention; Fig. 3, a detached view of a ring pertaining to the same.

Similar letters of reference indicate corresponding parts in the several figures.

The object of this invention is to attach the tip to the nozzle in such a manner that the tip will be allowed to rotate freely on the nozzle, and at the same time a perfect water-tight joint obtained. The invention is more especially designed to be applied to my revolving tip for nozzles for which Letters Patent were granted to me, bearing date October 14, 1862.

To enable those skilled in the art to fully understand and construct my invention, I will proceed to describe it.

A represents a nozzle, the outer end of which is cut or formed obliquely, as indicated by the line $a$. This end of the nozzle is turned down, so as to form a shoulder, $b$, all around its edge, and a square recess, $c$, is cut laterally into the side of the nozzle near its end, as shown clearly in Figs. 1 and 2.

B represents a metal ring, which is made of such dimension that it may be fitted in the recess $c$, the ring extending into the recess about half of its thickness, as shown in Figs. 1 and 2. This ring has a screw-thread cut on its outer surface, and it is cut or divided at any point $d$, so that it may be expanded in order to be adjusted into the recess $c$.

C represents a revolving tip, the inner edge of which is cut or formed obliquely, corresponding to the obliquity of the outer end of the nozzle A. The inner end of the tip C has a recess turned in its lower edge to receive the end of the nozzle A, and a female screw is cut in the inner end of the nozzle to receive the male screw on the ring B.

When the tip C is screwed on the ring B, the tip is allowed to rotate freely, as the ring is allowed to turn freely in the recess $c$.

An annular packing, $d'$, is inserted between the shoulder $b$ of the nozzle A and the inner end of the tip C, as shown in Figs. 1 and 2.

In order to prevent the ring B from turning when the tip C is screwed upon it, a hole, $e$, is drilled through the nozzle from its inner side and into the ring, and a wire inserted therein, as shown in red in Fig. 1, and if necessary or desired a set-screw may be fitted in the lower part of the tip and screwed against the ring B, in order to prevent the tip from turning on the ring. By this arrangement it will be seen that the tip C will be firmly secured to the nozzle A, and a perfectly water-tight connection obtained.

I would remark that the ring B may be cut partly through at a point opposite the cut $d$, in order to facilitate the springing of the ring B, and in fact the ring may be made in two parts and fitted in the recess $c$.

Having thus described my invention, what I claim as new, and desire to secure by Letters Patent, is—

The securing of the tip C to the nozzle A by means of a ring B, cut or divided at any point, or formed of two or more parts, and fitted in a recess, $c$, in the end of a nozzle, A, and having a screw-thread cut on its outer side, upon which the inner or lower end of the tip C is screwed, substantially as herein set forth.

H. B. MORRISON.

Witnesses:
JOHN G. BIXBY,
D. MORRISON.